(12) United States Patent
Han et al.

(10) Patent No.: US 11,055,854 B2
(45) Date of Patent: Jul. 6, 2021

(54) METHOD AND SYSTEM FOR REAL-TIME TARGET TRACKING BASED ON DEEP LEARNING

(71) Applicant: SEOUL NATIONAL UNIVERSITY R&DB FOUNDATION, Seoul (KR)

(72) Inventors: Bohyung Han, Seoul (KR); Ilchae Jung, Suwon-si (KR); Hyeonseob Nam, Seongnam-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 49 days.

(21) Appl. No.: 16/548,160

(22) Filed: Aug. 22, 2019

(65) Prior Publication Data

US 2020/0065976 A1 Feb. 27, 2020

(30) Foreign Application Priority Data

Aug. 23, 2018 (KR) .......................... 10-2018-0098335
Aug. 21, 2019 (KR) .......................... 10-2019-0102555

(51) Int. Cl.
*G06T 7/20* (2017.01)
*G06N 3/08* (2006.01)
(Continued)

(52) U.S. Cl.
CPC ................ *G06T 7/20* (2013.01); *G06F 17/15* (2013.01); *G06K 9/3233* (2013.01); *G06K 9/6267* (2013.01); *G06N 3/08* (2013.01)

(58) Field of Classification Search
CPC ... G06T 7/20; G06T 2207/20081; G06N 3/08; G06N 3/0454; G06F 17/15;
(Continued)

(56) References Cited

U.S. PATENT DOCUMENTS 10,147,193 B2 * 12/2018 Huang ................ G06K 9/4628
10,769,791 B2 *  9/2020 Song ...................... G06K 9/629
(Continued)

OTHER PUBLICATIONS

Hyeonseob Nam et al., Learning Multi-Domain Convolutional Neural Networks for Visual Tracking, IEEE Conference on Computer Vision and Pattern Recognition (CVPR), 2016, pp. 4293-4302.

(Continued)

*Primary Examiner* — Xuemei G Chen
(74) *Attorney, Agent, or Firm* — Goldilocks Zone IP Law

(57) ABSTRACT

The invention disclosed here relates to a method and system for real-time target tracking based on deep learning. The method for real-time target tracking according to an embodiment is performed by a computing device including a processor, and includes pre-training a target tracking model for detecting a tracking target from an image using pre-inputted training data, receiving an image with a plurality of frames, and detecting the tracking target for each of the plurality of frames by applying the target tracking model to the image. According to an embodiment, there is a remarkable reduction in the time required to detect the target from the image, thereby allowing real-time visual tracking, and improvement of the hierarchical structure and introduction of a new loss function make it possible to achieve more precise localization and distinguish different targets of similar shapes.

15 Claims, 9 Drawing Sheets

(51) Int. Cl.
*G06F 17/15* (2006.01)
*G06K 9/62* (2006.01)
*G06K 9/32* (2006.01)

(58) Field of Classification Search
CPC .. G06K 9/6267; G06K 9/3233; G06K 9/3241; G06K 9/4628; G06K 9/6273
See application file for complete search history.

(56) References Cited

U.S. PATENT DOCUMENTS

| | | | | |
|---|---|---|---|---|
| 10,783,640 | B2* | 9/2020 | Chen | G06N 3/08 |
| 2016/0328630 | A1* | 11/2016 | Han | G06K 9/6272 |
| 2017/0161591 | A1* | 6/2017 | English | G06K 9/4628 |
| 2017/0286774 | A1* | 10/2017 | Gaidon | G06K 9/00805 |
| 2018/0157939 | A1* | 6/2018 | Butt | H04N 21/466 |
| 2018/0211128 | A1* | 7/2018 | Hotson | G01S 13/931 |
| 2018/0276540 | A1* | 9/2018 | Xing | G06N 3/0454 |
| 2018/0300553 | A1* | 10/2018 | Khosla | G06K 9/00744 |
| 2018/0336683 | A1* | 11/2018 | Feng | G06N 3/0454 |
| 2018/0341872 | A1* | 11/2018 | Wang | G06T 7/11 |
| 2018/0365824 | A1* | 12/2018 | Yuh | G06T 7/0012 |
| 2019/0005361 | A1* | 1/2019 | Cho | G06T 7/20 |
| 2019/0034734 | A1* | 1/2019 | Yen | G06T 7/246 |
| 2019/0042850 | A1* | 2/2019 | Jones | G06K 9/00711 |
| 2019/0042867 | A1* | 2/2019 | Chen | G06K 9/46 |
| 2019/0058887 | A1* | 2/2019 | Wang | H04N 19/17 |
| 2019/0102678 | A1* | 4/2019 | Chang | G06K 9/627 |
| 2019/0114804 | A1* | 4/2019 | Sundaresan | G06K 9/66 |
| 2019/0172223 | A1* | 6/2019 | Vajda | G06K 9/4633 |
| 2019/0295302 | A1* | 9/2019 | Fu | G06K 9/6262 |
| 2019/0303746 | A1* | 10/2019 | Saruta | G06N 3/082 |
| 2019/0332898 | A1* | 10/2019 | Saruta | G06K 9/6273 |
| 2019/0373264 | A1* | 12/2019 | Chong | H04N 19/13 |
| 2019/0385005 | A1* | 12/2019 | Yang | G06K 9/4642 |
| 2020/0034976 | A1* | 1/2020 | Stone | G06N 3/084 |
| 2020/0118423 | A1* | 4/2020 | Moura | G08G 1/0116 |
| 2020/0167654 | A1* | 5/2020 | Guo | G06N 3/063 |
| 2020/0372692 | A1* | 11/2020 | Ge | G06T 11/00 |

OTHER PUBLICATIONS

Ross Girshick, Fast R-CNN, IEEE International Conference on Computer Vision (ICCV), 2015, pp. 1440-1448.
Kaiming He et al., Mask R-CNN, IEEE International Conference on Computer Vision (ICCV), 2017, pp. 2961-2969.

* cited by examiner

FIG. 6

1: procedure TRAINING
   Input: Initial VGG-M $\{w_1, ..., w_3\}$ and dataset $D$
   Output: Trained CNN filters $\{w_1, ..., w_5\}$
2:     Randomly initialize $w_4, w_5$
3:     Randomly initialize $w_6^i$ for each sequence $d_i \in D$
4:     $k = 0$
5:     while not converged do
6:         Randomly choose t frames, $I = \{I_1, I_2, ..., I_t\}$ from sequence $d_k$
7:         Draw positive samples $S_k^+$ and negative samples, $S_k^-$ from $I$
8:         Compute $L = L_{cls} + \lambda L_{inst}$ from $S_k^+$ and $S_k^-$
9:         Update $\{w_1, w_2, ..., w_6^d\}$ using $L$
10:        $k = (k + 1) \mod len(D)$

METHOD AND SYSTEM FOR REAL-TIME TARGET TRACKING BASED ON DEEP LEARNING

CROSS-REFERENCE TO RELATED APPLICATION

This application claims priority to Korean Patent Application No. 10-2018-0098335, filed on Aug. 23, 2018 and Korean Patent Application No. 10-2019-0102555, filed on Aug. 21, 2019, and all the benefits accruing therefrom under 35 U.S.C. § 119, the contents of which in its entirety are herein incorporated by reference.

BACKGROUND

1. Field

The present disclosure relates to a method and system for real-time target tracking based on deep learning, and more particularly, to a method and system for real-time target tracking with improved performance of a target tracking algorithm in an image based on Convolutional Neural Networks (CNN) by improving the hierarchical structure and training method.

DESCRIPTION ABOUT NATIONAL RESEARCH AND DEVELOPMENT SUPPORT

This study was supported by the Innovation Growth Motivity Project (R&D)—Leading Research Support Project of Ministry of Science and ICT, Republic of Korea (Development of Predictive Visual Intelligence Source Technology, Project No. 171180925) under POSTECH Research and Business Development Foundation.

2. Description of the Related Art

Deep learning is technology used to group or classify objects or data. Contrary to humans, computers have difficulty in distinguishing objects only on pictures, and to overcome this limitation, machine learning has been developed. There are many types of machine learning algorithms according to the data classification methodology, and support vector machine (SVM) and Neural Networks are typical. Among them, deep learning is a sort of machine learning method proposed to overcome the limitation of the neural networks.

CNN

Research of Convolutional Neural Networks (CNN) starts from deep insight on the structure of human visual cortex. Many neurons in the human visual cortex each have a local receptive field, and this signifies that neurons only respond to visual stimuli within certain areas of the visual field. The receptive fields of the neurons may overlap and the overlapping receptive fields cover the entire visual field. CNN is an algorithm that allows a computer to recognize a target by mimicking the visual neural network.

CNN includes a convolutional layer and a pooling layer, and is not connected to all pixels of an input image like a fully-connected layer and is only connected to pixels within the receptive field of a neuron, and classifies a target in a manner in which the preceding layer concentrates on low level features of the target and the subsequent layer combines them into high level features. The pooling layer is used to reduce the spatial size of data. In the field of image recognition, the max pooling scheme for extracting a largest value from each filter is primarily used.

R-CNN

CNN greatly contributes to the development of the field of image recognition through machine learning, but earlier target detection models adopt a method that detects an object by tracking all regions of an image using a window having a fixed size, and thus they are inefficient in terms of speed. To solve this problem, Region-based Convolutional Neural Networks (R-CNN) is introduced, in which an object is detected by extracting a possible range in which an object may be present in an image, i.e., Region of Interest (ROI), and allowing it to pass through CNN.

Fast R-CNN

However, R-CNN also applies convolution for each of all ROIs, resulting in slow image classification, and simultaneously trains a model for extracting features of a target in an image, a model for classification and a model for extracting a bounding box, resulting in the increased time spent in training.

To solve this problem, Fast R-CNN is introduced, and as opposed to the existing R-CNN that performs a feature extraction algorithm for each of all ROIs, Fast R-CNN adopts a method that extracts feature maps for the entire image only once and calculates features in each ROI by approximating values on the shared feature map. Through this, it is possible to significantly reduce an amount of computation and greatly improve the speed of the algorithm as compared to the existing R-CNN.

RoI-Align

Published in 2017 ICCV, it is an algorithm for sampling features for ROIs in Fast R-CNN based algorithm. The existing Fast R-CNN algorithm uses the max pooling scheme that takes a maximum value at the ROI location of a feature map to extract ROI features, but this method is impossible to precisely localize ROIs, and difficult to discriminately represent different features for different ROIs. Accordingly, RoI-Align calculates the features by applying bilinear interpolation at the ROI location of the feature map to improve the localization performance.

MDNet

Published in 2016 CVPR, a proposed algorithm trains a binary class detector for separating a target from a background in an image using R-CNN based detection model, and tracks the location of the target on a video. Additionally, a pre-training method suitable for visual tracking is proposed, in which VGG-M (one of image recognition algorithms) based network pre-trained on the existing image classification dataset is fine-tuned on a visual tracking dataset to acquire an initial model suitable for detection. In this process, a multi domain learning method is proposed to find a robust model for an arbitrary target, in which training is performed on each domain for each video in which an independent target is present.

SUMMARY

Compared to target detection or classification in a static image, real-time target tracking in a dynamic image (a video) with a plurality of frames requires faster computation. The existing Region-based Convolutional Neural Networks (R-CNN) based algorithm does not track a target in a video in real time and merely detects a target in a single image, and because R-CNN calculates the features for all Regions of Interest (ROIs), real-time applications are not guaranteed due to the limitation on speed. Additionally, it is possible to separate a target from a background using a multi domain based learning model such as MDNet, but impossible to guarantee the classification between different targets of similar shapes.

The present disclosure is directed to providing an algorithm that improves the rate at which a target is detected from an image by enhancing the hierarchical structure of a target tracking model based on CNN, and through this, tracks a target in a video in real time. Additionally, the present disclosure is directed to providing a tracking model that distinguishes different targets of similar shapes through training by introducing a new loss function.

A method for real-time target tracking based on deep learning according to an embodiment of the present disclosure is performed by a computing device including a processor, and includes pre-training a target tracking model for detecting a tracking target from an image using pre-inputted training data, receiving an image with a plurality of frames, and detecting the tracking target for each of the plurality of frames by applying the target tracking model to the image.

In an embodiment, the target tracking model may include a feature map generation layer including at least one convolutional layer, the feature map generation layer for generating a feature map from the image, a feature extraction layer for extracting features of the target using bilinear interpolation of ROIs on the feature map, and a classification layer including at least one fully-connected layer, the classification layer for detecting a location of the target by calculating classification scores from the extracted features.

In an embodiment, the feature map generation layer may include three convolutional layers, a max pooling layer may be included between a first convolutional layer and a second convolutional layer, a max pooling layer may be excluded between the second convolutional layer and a third convolutional layer to generate a dense feature map, and dilation of the third convolutional layer may be set to be larger than dilation of the first convolutional layer and dilation of the second convolutional layer to maintain a large receptive field.

In an embodiment, a kernel size of the first convolutional layer may be set to 7×7×3×96, a stride may be set to 2, and the dilation may be set to 1, a kernel size of the max pooling layer may be set to 3×3, and a stride may be set to 2, a kernel size of the second convolutional layer may be set to 5×5×96×256, a stride may be set to 2, and the dilation may be set to 1, and a kernel size of the third convolutional layer may be set to 3×3×256×512, a stride may be set to 1, and the dilation may be set to 3.

In an embodiment, the classification layer may include three fully-connected layers, a kernel size of a first fully-connected layer may be set to 3×3×512×512, a kernel size of a second fully-connected layer may be set to 1×1×512×512, and a kernel size of a third fully-connected layer may be set to 1×1×512×2.

In an embodiment, the pre-training of the target tracking model may be multi domain based learning in which training is performed on each domain for each image in which an independent target is present.

In an embodiment, the pre-training of the target tracking model may include updating parameters of each layer included in the target tracking model to minimize a loss function, and the loss function may represent a difference between a result value of detection of the tracking target from the image by the target tracking model and a true value.

In an embodiment, the loss function may include an instance embedding loss for distinguishing different targets of similar shapes.

In an embodiment, the instance embedding loss $L_{inst}$ may be represented as the following Equation, $$L_{inst} = -\frac{1}{N}\sum_{i=1}^{N}\sum_{d=1}^{D}[y_i]_{1d} \cdot \log([\sigma_{inst}(f_i^d)]_{1d})$$

where N denotes the number of data included in a training batch, and D denotes the number of domains, and the target tracking model may be trained, taking both the instance embedding loss and a binary class loss into account.

There may be provided a computer program stored in a computer-readable recording medium for implementing the method for real-time target tracking based on deep learning according to embodiments.

A system for real-time target tracking based on deep learning according to an embodiment of the present disclosure includes a target tracking model for detecting a tracking target from an image, a training unit configured to pre-train the target tracking model using pre-inputted training data, a receiving unit configured to receive an image including a plurality of frames, and a detection unit configured to detect the tracking target for each of the plurality of frames by applying the target tracking model to the image.

In an embodiment, the pre-training of the target tracking model may be multi domain based learning in which training is performed on each domain for each image in which an independent target is present.

In an embodiment, the training unit may be configured to update parameters of each layer included in the target tracking model to minimize a loss function, and the loss function may represent a difference between a result value of detection of the tracking target from the image by the target tracking model and a true value.

According to an embodiment of the present disclosure, there is a remarkable reduction in the time required to detect a target from an image, thereby allowing real-time visual tracking that is impossible in the existing algorithm. That is, it is possible to detect a target each frame in a video including a plurality of frames in real time. Additionally, it is possible to acquire denser feature maps and maintain a larger receptive field through improvement of the CNN structure, thereby achieving more precise localization. Accordingly, it is possible to minimize a performance loss by virtue of the improved speed of the real-time tracking algorithm. Further, it allows the tracking model to distinguish different targets of similar shapes by introducing a new loss function to the existing multi domain learning method.

BRIEF DESCRIPTION OF THE DRAWINGS

To describe the technical solution of the embodiments of the present disclosure or the related art more clearly, the following is a brief introduction to the drawings necessary for the description of the embodiments. It should be understood that the accompanying drawings are not intended to limit the embodiments described herein, and they are for illustration purposes only. Additionally, for clarity, some elements with various modifications such as exaggeration and omission may be shown in the accompanying drawings.

FIG. 6 illustrates a training method of a target tracking model according to an embodiment.

DETAILED DESCRIPTION

Hereinafter, the embodiments will be described in detail with reference to the accompanying drawings and the context described in the accompanying drawings, but the intended scope of claims is not restricted or limited by the embodiments.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Additionally, the embodiment described herein may have aspects of entirely hardware, partly hardware and partly software, or entirely software. The term "unit", "device" or "system" used herein refers to computer related entity such as hardware, hardware and software in combination, or software. For example, the unit, module, device, server or system may refer to hardware that makes up a platform in part or in whole and/or software such as an application for operating the hardware.

Hereinafter, the embodiments of the present disclosure will be described in detail with reference to the accompanying drawings.

Real-Time Target Tracking Algorithm Based on Deep Learning

Figure 1:
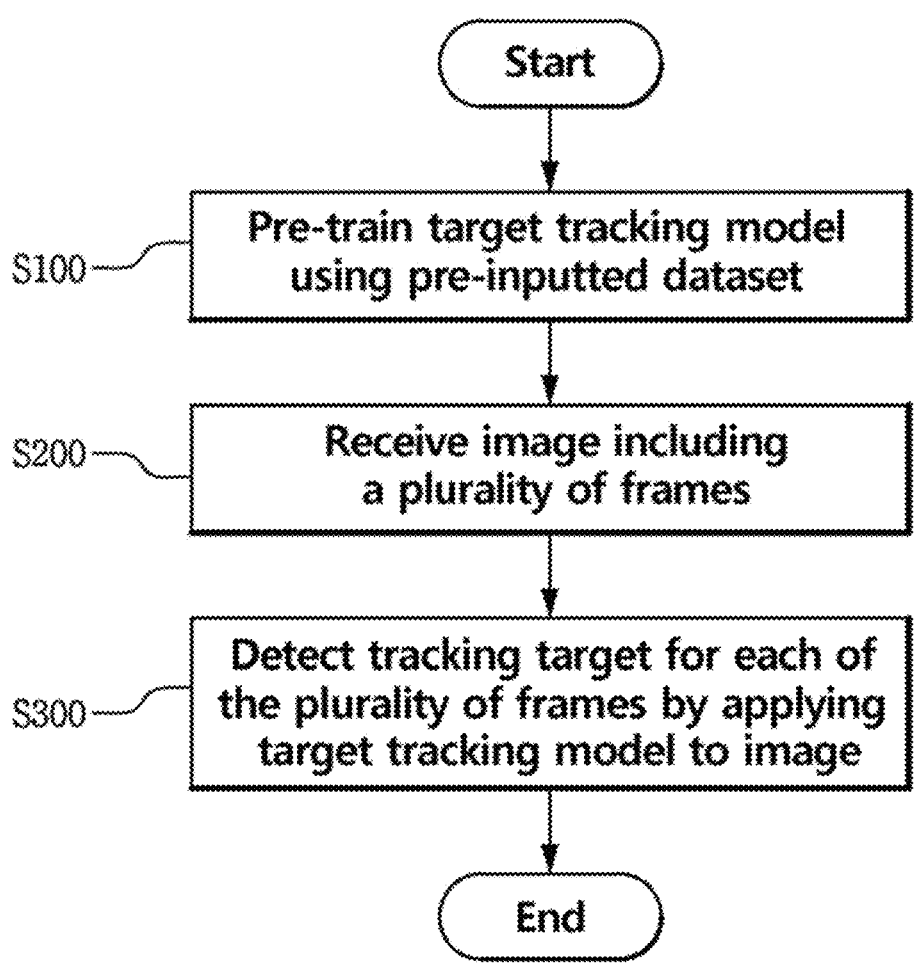
FIG. 1 is a flowchart of a method for real-time target tracking according to an embodiment.

FIG. 1 is a flowchart showing a method for real-time target tracking based on deep learning according to an embodiment. Referring to FIG. 1, the method for target tracking according to an embodiment includes pre-training a target tracking model using pre-inputted training data (S100), receiving an image with a plurality of frames (S200), and detecting a tracking target for each of the plurality of frames by applying the target tracking model to the image (S300). Each of the steps (S100 to S300) may be performed by a computing device including a processor, and the computing device may further include additional components for processing an image signal or calculating and outputting a result value.

Figure 2:
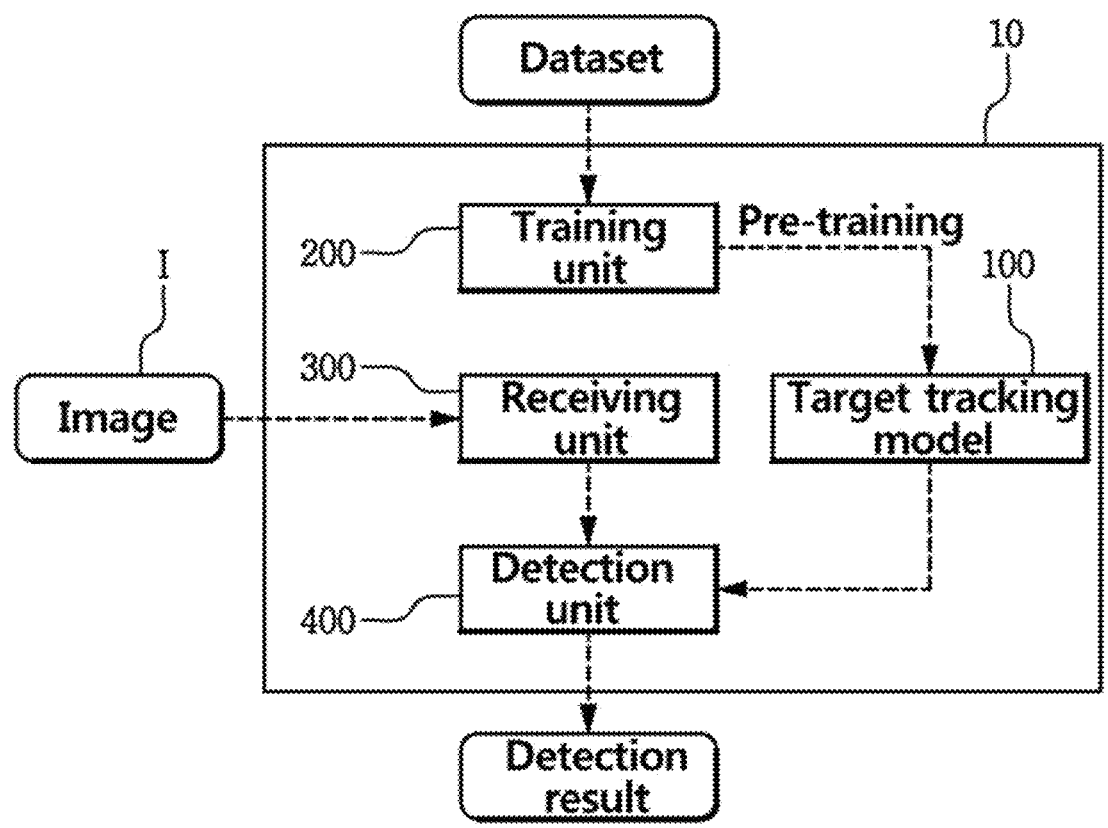
FIG. 2 is an architecture diagram of a system for real-time target tracking according to an embodiment.

FIG. 2 is an architecture diagram of a system for real-time target tracking based on deep learning according to an embodiment. Referring to FIG. 2, the system 10 for target tracking according to an embodiment includes a target tracking model 100 for detecting a tracking target from an image, a training unit 200 configured to pre-train the target tracking model using pre-inputted training data, a receiving unit 300 configured to receive an image with a plurality of frames, and a detection unit 400 configured to detect the tracking target for each of the plurality of frames by applying the target tracking model to the image.

Although for convenience of description, each of the components 100 to 400 is depicted as an individual block in the specification and drawings, the components do not necessarily correspond to individual hardware or software units. Accordingly, the functions of each component may be all performed by a single processor, and the functions may be grouped and performed by separate processors respectively.

The present disclosure relates to a method and system for detecting and tracking a target each frame in an image (a video) including a plurality of frames in real time.

To detect the target from the image, first, the step of pre-training a target tracking model is performed (S100). Referring to FIG. 2, the training unit 200 is configured to pre-train the target tracking model 100. The target tracking model 100 refers to an algorithm for detecting a tracking target from an inputted image, and is trained to split the image into a foreground and a background based on Convolutional Neural Networks (CNN).

Figure 3:
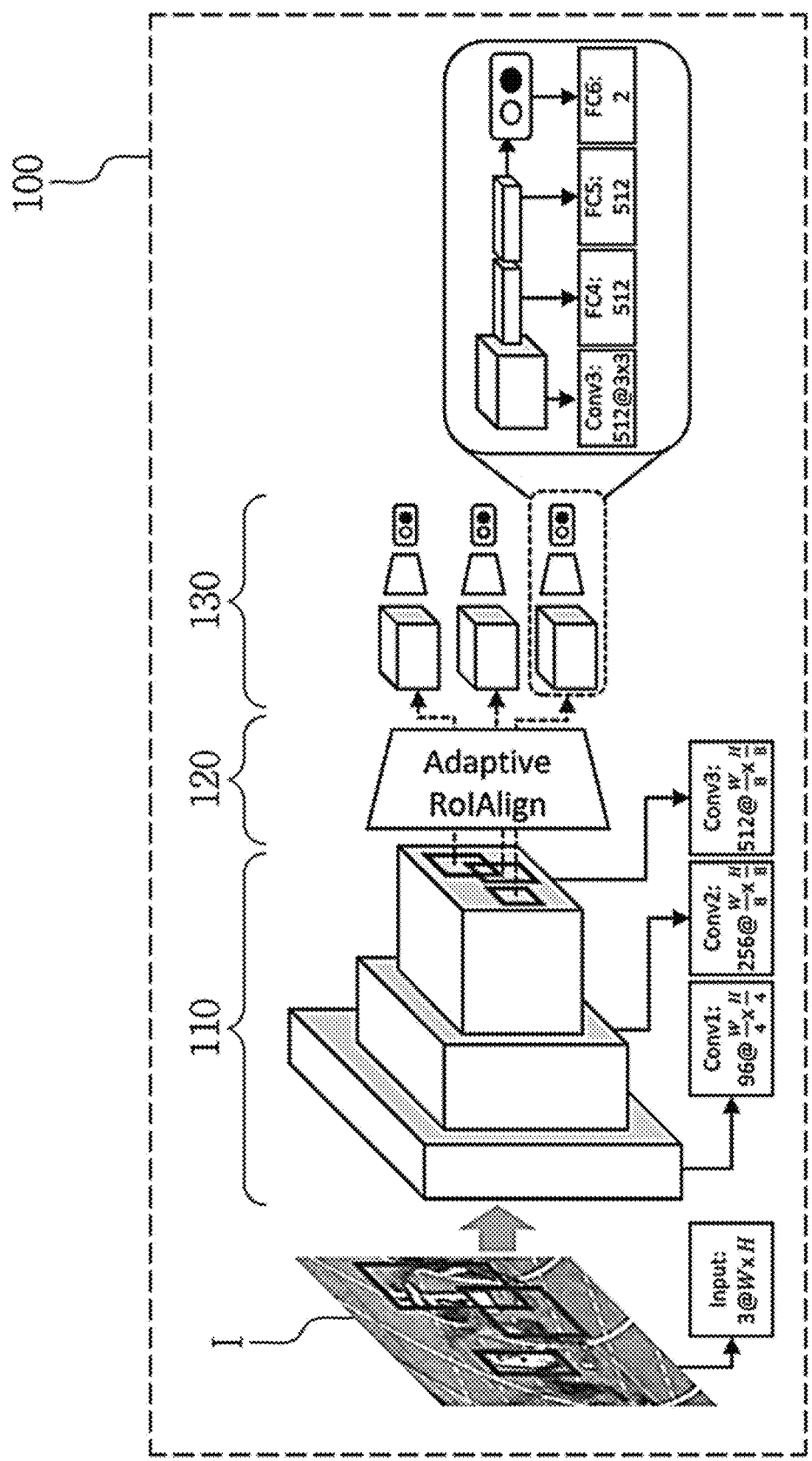
FIG. 3 shows Convolutional Neural Networks (CNN) structure of a real-time target tracking model according to an embodiment.

As shown in FIG. 3, the target tracking model 100 according to an embodiment includes a plurality of hierarchical structures, and each layer is configured to perform its function.

Referring to FIG. 3, the target tracking model 100 according to an embodiment may include a feature map generation layer 110 including at least one convolutional layer, a feature extraction layer 120 for extracting (by sampling) features based on RoI-Align, and a classification layer 130 including at least one fully-connected layer.

The pre-training is a process of optimizing the parameters of each layer, and the target tracking model is updated to minimize a loss function representing a difference (i.e. error) between a result value of detection of the tacking target from the image and a true value.

According to an embodiment, the pre-training of the target tracking model is multi domain based learning. Specifically, in CNN hierarchical structure, preceding layers, i.e., a first convolutional layer Conv1 to a fifth fully-connected layer FC5 are shared. In this instance, each video in which a tracking target is present is divided into independent domains, and an independent sixth fully-connected layer FC6 layer is trained by a binary class detector each domain. The multi domain based learning method is suitable in the field of visual tracking that requires target tracking irrespective of class.

The concept and effect of an instance embedding loss newly introduced in the training process of the present disclosure will be described below. Hereinafter, the structure and function of lower levels of each layer 110, 120, 130 will be explained.

According to an embodiment, the feature map generation layer 110 may include three convolutional layers, i.e., a first convolutional layer Conv1, a second convolutional layer Conv2 and a third convolutional layer Conv3. In an embodiment, a max pooling layer may be included or omitted between the first convolutional layer Conv1 and the second convolutional layer Conv2.

According to an embodiment, instead of excluding the max pooling layer between the second convolutional layer Conv2 and the third convolutional layer Conv3, the third convolutional layer Conv3 may be replaced by a dilated layer, thereby acquiring a denser feature map than the existing VGG-M model.

Figure 4A:
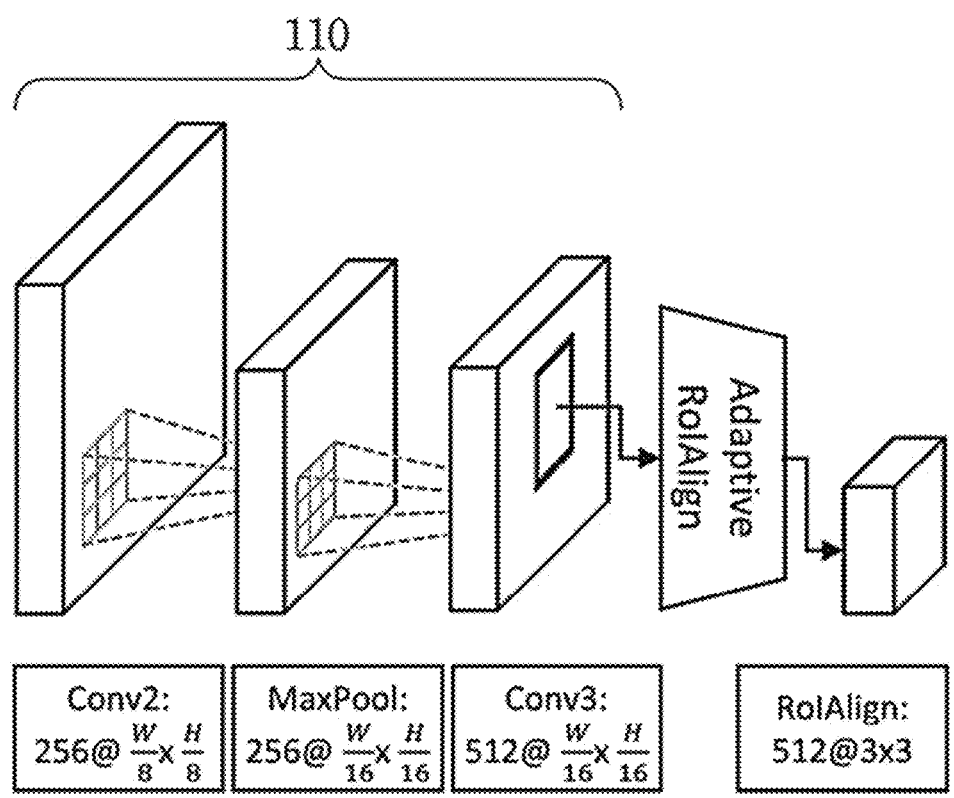
FIG. 4A shows part of CNN structure according to the related art.

FIG. 4A shows part of the structure of the VGG-M network, one of the image recognition algorithms according to the related art. As shown in FIG. 4A, the existing VGG-M model includes the max pooling layer between the second convolutional layer Conv2 and the third convolutional layer Conv3, and has the reduced spatial size of data.

Figure 4B:
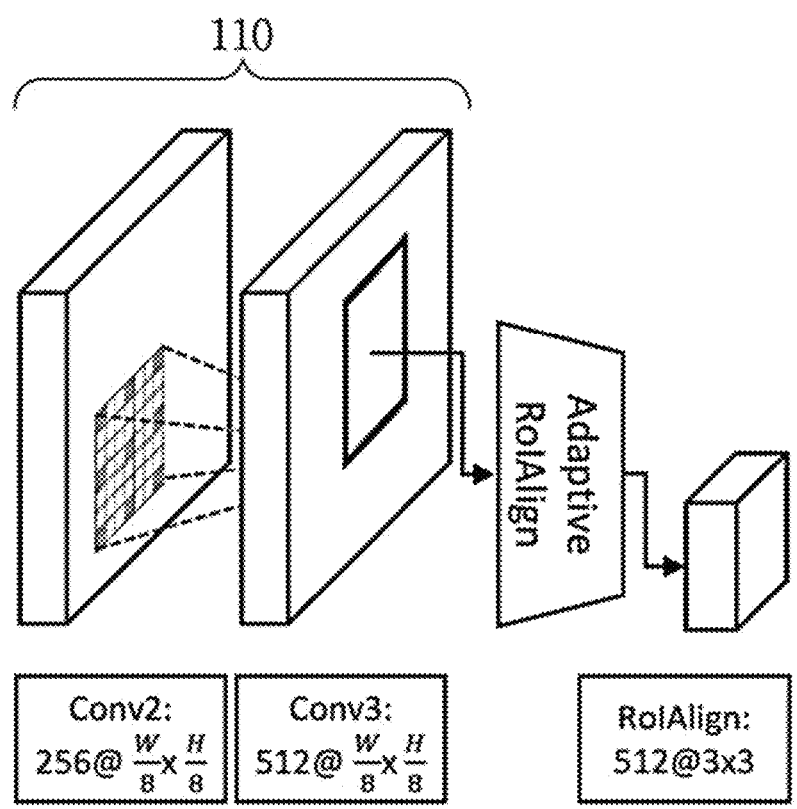
FIG. 4B shows part of CNN structure of a real-time target tracking model according to an embodiment.

FIG. 4B shows part of the structure of the target tracking model according to an embodiment of the present disclosure. When compared with the structure of FIG. 4A, the model according to an embodiment replaces the third convolutional layer Conv3 by a dilated layer, instead of excluding the pooling layer between the second convolutional layer Conv2 and the third convolutional layer Conv3. The dilation of the third convolutional layer Conv3 is set to be larger than the first and second convolutional layers Conv1, Conv2 to maintain a larger receptive field of each activation on the feature map, and the distance between activations is set to 8 pixels (that is narrower than the max pooling layer according to the related art in which the distance between activations is set to 16 pixels). Accordingly, it is possible to generate dense feature maps, and precisely represent localization while maintaining the representation power of features extracted from Region of Interest (ROI). In other words, because locally richer features from dense feature maps can be used in RoI-Align, localization can be precisely represented, and as a large receptive field is maintained, the representation power of each activation can be strongly maintained.

The receptive field corresponds to a filter or a kernel, and has weight parameters in the convolutional layers. The model is trained to find proper filters (i.e., parameters) in the training step, and the convolutional layer applies the filter to input data, outputs a feature map in which regions of the image similar to the filter are emphasized, and passes it to the next layer. The convolution process in each layer is well known in the art and its detailed description is omitted herein.

Referring back to FIG. 3, the input data passing through the feature map generation layer 110 is sent to the feature extraction layer 120. The feature extraction layer 120 samples features of the target using bilinear interpolation for ROIs on the feature map generated by the feature map generation layer 110. The existing Fast R-CNN algorithm primarily uses the max pooling scheme that takes a maximum value at the ROI location of the feature map to extract features from ROIs, but this method is impossible to precisely localize ROIs, and difficult to discriminately represent different features for different ROIs. Accordingly, the present disclosure calculates features through bilinear interpolation at the ROI location of the feature map by applying the RoI-Align algorithm, thereby representing the local characteristics of different ROIs more adaptively.

The classification layer 130 is a layer for detecting the location of the target by calculating classification scores from the sampled features, and may include at least one fully-connected layer and a probability layer. Referring to FIG. 3, the classification layer 130 may include three fully-connected layers FC4, FC5, FC6. Each fully-connected layer includes a plurality of fully-connected nodes, and each node converts input data into output data based on weights for each node. The fully-connected layer receives the feature map of the tracking target outputted from the feature extraction layer 120, and outputs a feature value based on the weights of the plurality of nodes.

FC6 layer detects the target by splitting the input image into a foreground and a background based on the output value outputted from FC5 layer. In an example, the probability of detection of the tracking target may be calculated by softmax. As described above, according to the multi domain based learning method, each video in which a tracking target is present may be divided into independent domains, and the independent FC6 layer may be trained by a binary class detector each domain.

The target tracking model according to an embodiment of the present disclosure does not calculate all features per RoI like the existing technology such as R-CNN, and instead, receives the entire image as the input of CNN and passes it through the convolutional layer to calculate feature maps first, then extracts features for each RoI location on the shared feature map. The fully-connected layer calculates classification scores from the extracted features and detects the location of the tracking target. Accordingly, it is possible to detect a target at an improved speed compared to the existing technology, and track a target in a video image including a plurality of frames in real time.

When the pre-training of the target tracking model is completed, an image with a plurality of frames is received (S200). As shown in FIG. 2, the receiving unit 300 receives image I data from the outside. The present disclosure aims at tracking a target in real time by detecting the target each frame in a video. Accordingly, the image may be a dynamic image (a video) including a plurality of frames, but is not limited thereto, and it is obvious that a target may be detected from a static image (picture) including a single frame. Additionally, the image received by the receiving unit 300 may be user input data retrieved from the memory, or an image captured by an optical device such as a camera.

The received image data is transmitted to the detection unit 400, and the detection unit 400 tracks the target in real time by detecting the tracking target (i.e., classifying the target and the background in the image) for each of the plurality of frames by applying the pre-trained target tracking model 100 to the image I (S300).

Hereinafter, an online-tracking process for tracking the target in the image will be described in detail. First, the pre-trained target tracking model is fine-tuned by a binary class detector for separating a target from a background on the first frame of the image (video). Subsequently, new target candidate samples are extracted near the target location of the previous frame each frame, classification scores of each sample calculated from the trained detector are calculated, and a location of highest score is determined as a new target location. The detector updates (long-term updates) using a newly found target and background at a regular frame interval, and when the classification score is not sufficiently high, immediately updates (short-term updates) as an exceptional case. Accordingly, CNN based appearance model can implement the update strategy that can adapt to appearance changes of the target into long-term updates and short-term updates.

Instance Embedding Loss

Hereinafter, a training method newly introduced in the present disclosure will be described with reference to FIGS. 5 and 6.

In the existing multi domain learning, a CNN model is trained by applying a binary class loss $L_{cls}$ designed to classify a target and a background each domain. In an embodiment of the present disclosure, an instance embedding loss $L_{inst}$ is additionally introduced. This loss function is not applied to ROIs extracted from the background of each domain, and brings the widening effect of the distance between target instances of each domain by applying a multi classification loss so that the corresponding domain classification scores of ROIs extracted from the targets of each domain are higher than classification scores obtained by passing through the fully-connected layer of other domains. The classification result $fc6^1$-$fc6^D$ obtained by passing $x^d$ representing the feature of ROI R extracted in the domain d through each domain is vectorized as below.

$$f^d = [\psi^1(x^d;R), \psi^2(x^d;R), \ldots, \psi^D(x^d;R)]  \quad \text{[Equation 1]}$$

In the above Equation, $\psi^d(\bullet;\bullet)$ denotes classification result in fc6 of $d^{th}$ domain. $f^d$ may be calculated by two softmaxes as below in a binary class direction and a domain direction.

$$[\sigma_{cls}(f^d)]_{ij} = \frac{\exp(f^d_{ij})}{\sum_{k=1}^{2} \exp(f^d_{kj})} \quad \text{[Equation 2]}$$

$$[\sigma_{inst}(f^d)]_{ij} = \frac{\exp(f^d_{ij})}{\sum_{k=1}^{D} \exp(f^d_{ik})} \quad \text{[Equation 3]}$$

In this instance, the binary classification loss $L_{cls}$ and the instance embedding loss $L_{inst}$ may be calculated as below, and finally, the model is trained so that the weighted sum of the two loss values is minimum.

$$L_{cls} = -\frac{1}{N}\sum_{i=1}^{N}\sum_{c=1}^{2}[y_i]_{c\tilde{d}(k)} \cdot \log\left(\left[\sigma_{cls}\left(f_i^{\tilde{d}(k)}\right)\right]_{c\tilde{d}(k)}\right) \quad \text{[Equation 4]}$$

Where $(k) = k \bmod D$, $yi \in \{0,1\}^{2 \times D}$ s.t. $[y_i]_{cd} = \begin{cases} 1 & \text{if } R \text{ is class } c \text{ of domain } d \\ 0 & \text{otherwise} \end{cases}$ $$L_{inst} = -\frac{1}{N}\sum_{i=1}^{N}\sum_{d=1}^{D}[y_i]_{1d} \cdot \log([\sigma_{inst}(f_i^d)]_{1d}) \quad \text{[Equation 5]}$$

$$L = L_{cls} + \lambda L_{inst} \quad \text{[Equation 6]}$$

Figure 5:
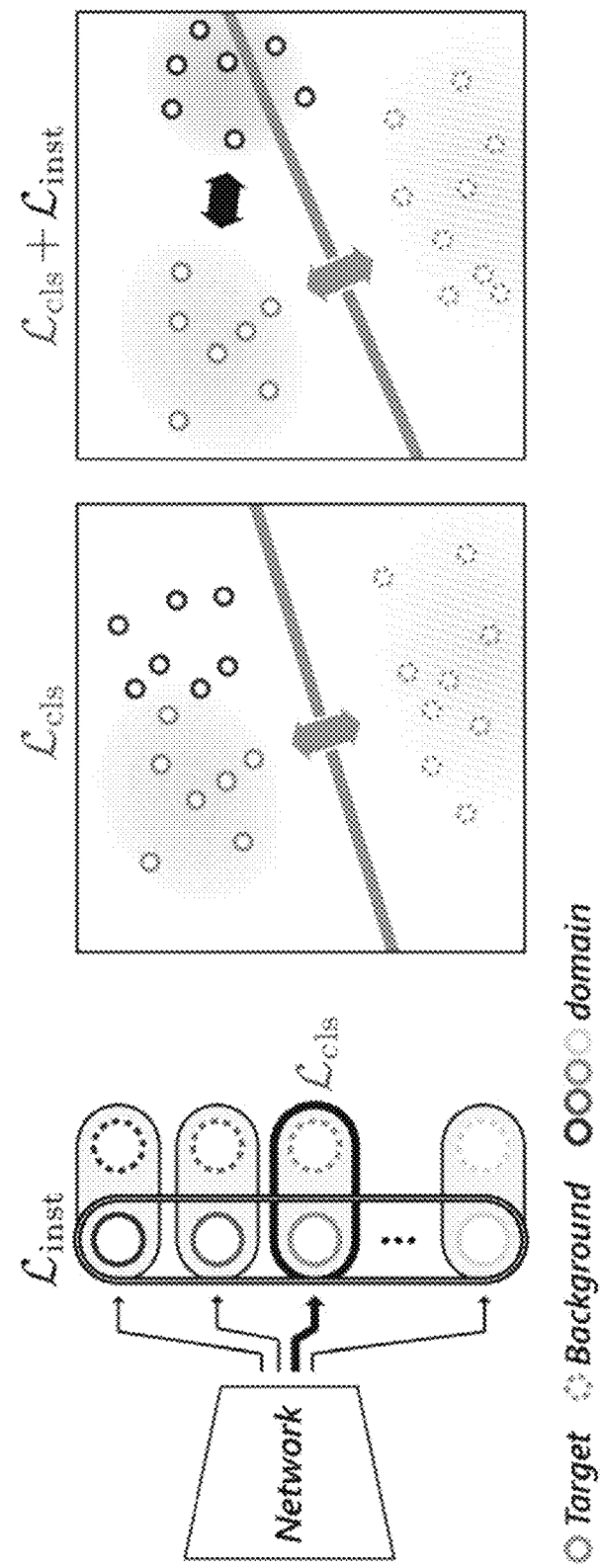
FIG. 5 shows the result of introducing an instance embedding loss in a training method of a target tracking model according to an embodiment.

The calculation of the loss function is diagrammatically illustrated in FIG. 5, showing the influence of the instance embedding loss on the distance between domains. That is, the binary classification loss is for separating a target and a background in each domain, while the instance embedding loss is for separating instances in multi domains.

FIG. 6 illustrates the training method of the target tracking model according to an embodiment. Referring to lines 8-9 of FIG. 6, compared to the existing VGG-M model, the loss function is calculated by summing up values obtained by multiplying the binary class loss $L_{cls}$ and the instance embedding loss $L_{inst}$ by the coefficient $\lambda$, and the parameters of the filters are updated based on the calculated loss function L.

In the existing multi domain based learning model, it is possible to learn objectness to separate a target from a background, but difficult to guarantee the classification of different targets of similar shapes, i.e., instances. According to an embodiment of the present disclosure, the introduction of a new instance embedding loss term makes it possible to learn an embedding space so that different instances are far away, and train the model to distinguish look-alike but different objects. As a result, visual tracking performance improves.

Specific Embodiment

The following table shows each of specific setting values of each layer that constitutes the target tracking model according to an embodiment, i.e., a kernel size, stride and dilation of each of the first convolutional layer Conv1 to the sixth fully-connected layer FC6.

TABLE 1

| Layer name | kernel size | stride | Dilation |
| --- | --- | --- | --- |
| Conv1 | 7 × 7 × 3 × 96 | 2 | 1 |
| Max pooling1 | 3 × 3 | 2 | — |
| Local Region Normalization1 | — | — | — |
| Conv2 | 5 × 5 × 96 × 256 | 2 | 1 |
| Local Region Normalization2 | — | — | — |
| Conv3 | 3 × 3 × 256 × 512 | 1 | 3 |
| RoI-Align | — | — | — |
| FC4 | 3 × 3 × 512 × 512 | 1 | 1 |
| Dropout | — | — | — |
| FC5 | 1 × 1 × 512 × 512 | 1 | 1 |
| Dropout | — | — | — |
| FC6 | 1 × 1 × 512 × 2 | 1 | 1 |

The target tracking model according to an embodiment is a CNN based model, and includes a convolutional layer and a fully-connected layer. RoI-Align is performed on feature maps calculated from the convolutional layers, and features in each ROI are calculated as below.

A result value approximated through bilinear interpolation in the same size of (7×7×512) is outputted in (3×3×512) size after passing through the max pooling layer (filter=3×3, stride=2). The dropout rates of all the dropout layers are equally 0.5.

As an initial model for pre-training, the parameters of the convolutional layers use the parameters of Conv1-3 in the same way as VGG-M network, and the parameters of the fully-connected layer are randomly initiated and used. In this instance, the learning rate is 0.0001 and $\lambda$=0.1. For 8 images per domain, 32 positive examples ($S_k^+$) extracted around the tracking target and 96 negative examples ($S_k^-$) extracted from the background are sampled, and each is trained to classify into a target class and a background class. On the basis of Intersection over Union (IoU) with the ground-truth of the target, 0.7 or more is defined as positive, and less than 0.5 is defined as negative, and for training data, IMAGENET-VID provided by ILSVRC 2015 is used.

The configuration of online tracking is basically the same as the strategy of MDNet. In the first frame with a given ground-truth $x_1$ of the target, training iterates for 50 times using 500 positive examples $S_1^+$ and 5000 negative examples $S_1^-$, and training is performed on a mini-batch including 32 positive examples $S_t^+$ and 96 negative examples $S_t^-$ in each iteration. In the online update (long-term updates/short-term updates) step of fine-tuning the model in the subsequent frames, training iterates for 15 times each time it is called, and a difference is that ROIs having 0.3 or less IoU with an estimated target ($x_t^*$) are sampled as negative example. The long-term updates are called every 10 frames, and short-term updates are called when the classification score f($x_t^*$) is equal to or less than 0.5.

As can be seen from Table 1, the embodiment does not interpose the max pooling layer between Conv2 and Conv3, and instead, sets dilation of Conv3 to a value that is larger than dilation of Conv1 and dilation of Conv2 to set a large receptive field and generate dense feature maps.

Figure 7:
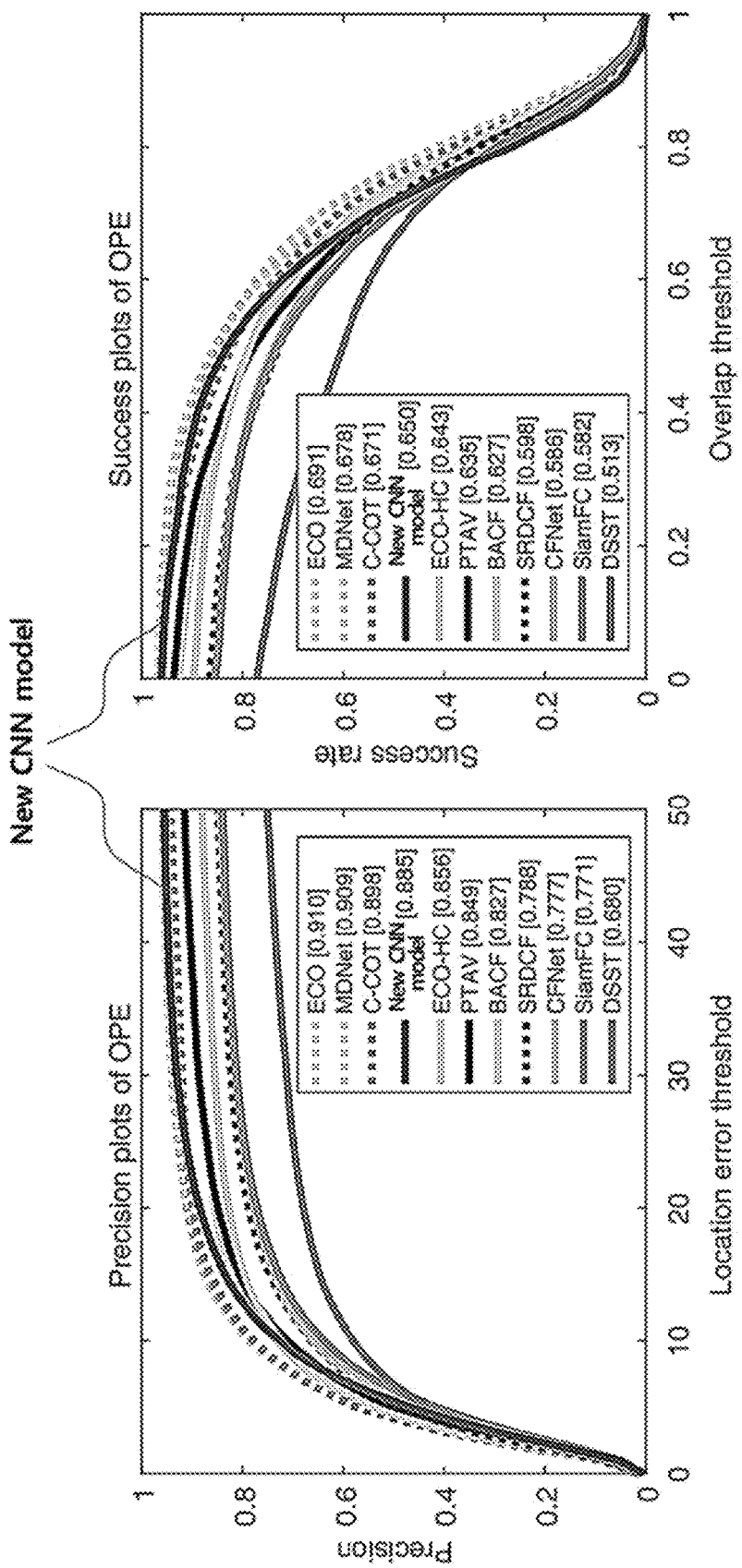
FIG. 7 is a graph showing the result of comparing the performance between a system for real-time target tracking according to an embodiment and other algorithms.

FIG. 7 is a graph showing the result of comparing the performance between a system for real-time target tracking based on deep learning according to an embodiment and other algorithms. Referring to the graph of FIG. 7, shown is a result of comparing the performance with other trackers in Online Tracking Benchmark 2015 (OTB2015). In the graph, the curve indicated by 'New CNN model' denote the result of applying the algorithm of the present invention, and trackers indicated by the dotted line are those that do not satisfy the real-time application due to slow detection. Those indicated by the solid line denote trackers that can track a target in a video in real time. Precision plot and Success plot represents the Success rate on the basis of center location and IoU respectively, and it can be seen that the model according to an embodiment of the present disclosure exhibits better performance than all the other real-time trackers.

Figure 8:
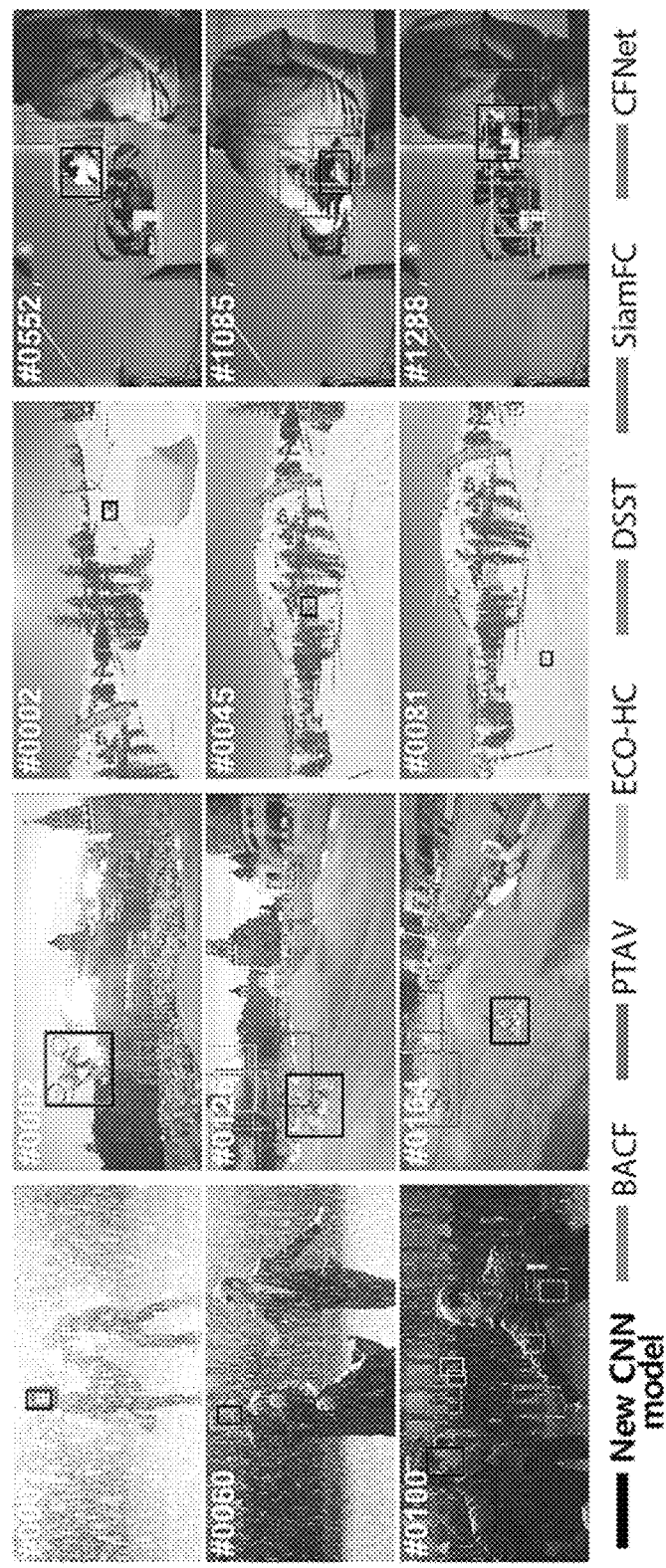
FIG. 8 shows the result of detecting a target from an image by applying a system for real-time target tracking according to an embodiment.

FIG. 8 shows the result of detecting the target from the image by applying the real-time target tracking algorithm based on deep learning according to an embodiment. As shown in FIG. 8, it can be seen that the target is detected in the form of a bounding box each frame of the image by the algorithm of the embodiment. This shows that the target tracking algorithm of the present disclosure can track the target accurately in the same way as other trackers.

According to the real-time target tracking algorithm described hereinabove, there is a remarkable reduction in the time required to extract ROI features in an image, thereby allowing real-time visual tracking that is impossible in the existing algorithm. That is, it is possible to detect a tracking target each frame in a video with a plurality of frames in real time.

Additionally, it is possible to generate denser feature maps and maintain a larger receptive field through improvement of the CNN structure, thereby achieving more precise localization. Accordingly, it is possible to minimize a performance loss by virtue of the improved speed of the real-time tracking algorithm. Further, it allows the tracking model to distinguish different targets of similar shapes by introducing a new loss function to the existing multi domain learning method.

The method for real-time target tracking based on deep learning according to an embodiment may be implemented in the form of applications or program commands that can be executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the processing according to the present disclosure, or vice versa.

While the present disclosure has been hereinabove described with reference to the embodiments, those skilled in the art will understand that various modifications and changes may be made thereto without departing from the spirit and scope of the present disclosure defined in the appended claims.

What is claimed is:

1. A method for real-time target tracking based on deep learning, performed by a computing device including a processor, comprising:
    pre-training a target tracking model for detecting a tracking target from an image using pre-inputted training data;
    receiving an image with a plurality of frames; and
    detecting the tracking target for each of the plurality of frames by applying the target tracking model to the image,
    wherein the target tracking model includes;
    a feature map generation layer including at least one convolutional layer, the feature map generating layer for generating a feature map from the image;
    a feature extraction layer for extracting features of the target using bilinear interpolation of Regions of Interest (ROIs) on the feature map; and
    a classification layer including at least one fully-connected layer, the classification layer for detecting a location of the target by calculating classification scores from the extracted features,
    wherein the feature map generation layer includes three convolutional layers,
    a max pooling layer is included between a first convolutional layer and a second convolutional layer,
    a max pooling layer is excluded between the second convolutional layer and a third convolutional layer to generate a dense feature map, and
    dilation of the third convolutional layer is set to be larger than dilation of the first convolutional layer and dilation of the second convolutional layer to maintain a large receptive field.

2. The method for real-time target tracking based on deep learning according to claim 1, wherein a kernel size of the first convolutional layer is set to 7×7×3×96, a stride is set to 2, and the dilation is set to 1,
    a kernel size of the max pooling layer is set to 3×3, and a stride is set to 2,
    a kernel size of the second convolutional layer is set to 5×5×96×256, a stride is set to 2, and the dilation is set to 1, and
    a kernel size of the third convolutional layer is set to 3×3×256×512, a stride is set to 1, and the dilation is set to 3.

3. The method for real-time target tracking based on deep learning according to claim 2, wherein the classification layer includes three fully-connected layers,
    a kernel size of a first fully-connected layer is set to 3×3×512×512,
    a kernel size of a second fully-connected layer is set to 1×1×512×512, and
    a kernel size of a third fully-connected layer is set to 1×1×512×2.

4. The method for real-time target tracking based on deep learning according to claim 1, wherein the pre-training of the target tracking model is multi domain based learning in which training is performed on each domain for each image in which an independent target is present.

5. The method for real-time target tracking based on deep learning according to claim 4, wherein the pre-training of the target tracking model comprises updating parameters of each layer included in the target tracking model to minimize a loss function, and
the loss function represents a difference between a result value of detection of the tracking target from the image by the target tracking model and a true value.

6. The method for real-time target tracking based on deep learning according to claim 5, wherein the loss function includes an instance embedding loss for distinguishing different targets of similar shapes.

7. The method for real-time target tracking based on deep learning according to claim 6, wherein the instance embedding loss $L_{inst}$ is represented as the following Equation, $$L_{inst} = -\frac{1}{N}\sum_{i=1}^{N}\sum_{d=1}^{D}[y_i]_{1d} \cdot \log([\sigma_{inst}(f_i^d)]_{1d})$$

where N denotes the number of data included in a training batch, D denotes the number of domains, $y_i$ denotes a label of ith image with size of 2×D, $\sigma_{inst}$ denotes a softmax function in D channels in the domain direction, $f_i^d$ denotes an output forwarded a sample selected from dth domain to a network, $[\sigma_{inst}(f_i^d)]_{1d}$ denotes a positive score in dth domain in the present sample, and
the target tracking model is trained, taking both the instance embedding loss and a binary class loss into account.

8. A computer program stored in a non-transitory computer-readable recording medium for implementing a method for real-time target tracking based on deep learning, the method comprising:
pre-training a target tracking model for detecting a tracking target from an image using pre-inputted training data;
receiving an image with a plurality of frames; and
detecting the tracking target for each of the plurality of frames by applying the target trackinq model to the image,
wherein the target trackinq model includes:
a feature map generation layer including at least one convolutional layer, the feature map generating layer for generating a feature map from the image;
a feature extraction layer for extracting features of the target using bilinear interpolation of Regions of Interest (ROIs) on the feature map; and
a classification layer including at least one fully-connected layer, the classification layer for detecting a location of the target by calculating classification scores from the extracted features,
wherein the feature map generation layer includes three convolutional layers,
a max pooling layer is included between a first convolutional layer and a second convolutional layer,
a max pooling layer is excluded between the second convolutional layer and a third convolutional layer to generate a dense feature map, and
dilation of the third convolutional layer is set to be larger than dilation of the first convolutional layer and dilation of the second convolutional layer to maintain a large receptive field.

9. A system for real-time target tracking based on deep learning, comprising:
a target tracking model for detecting a tracking target from an image;
a trainer configured to pre-train the target tracking model using pre-inputted training data;
a receiver configured to receive an image with a plurality of frames; and
a detector configured to detect the tracking target for each of the plurality of frames by applying the target tracking model to the image,
wherein the target tracking model includes:
a feature map generation layer including at least one convolutional layer, the feature map generation layer for generating a feature map from the image;
a feature extraction layer for extracting features of the target using bilinear interpolation of Regions of Interest (ROIs) on the feature map; and
a classification layer including at least one fully-connected layer, the classification layer for detecting a location of the target by calculating classification scores from the extracted features,
wherein the feature map generation layer includes three convolutional layers,
a max pooling layer is included between a first convolutional layer and a second convolutional layer,
a max pooling layer is excluded between the second convolutional layer and a third convolutional layer to generate a dense feature map, and
dilation of the third convolutional layer is set to be larger than dilation of the first convolutional layer and dilation of the second convolutional layer to maintain a large receptive field.

10. The system for real-time target tracking based on deep learning according to claim 9, wherein a kernel size of the first convolutional layer is set to 7×7×3×96, a stride is set to 2, and the dilation is set to 1,
a kernel size of the max pooling layer is set to 3×3, and a stride is set to 2,
a kernel size of the second convolutional layer is set to 5×5×96×256, a stride is set to 2, and the dilation is set to 1,
a kernel size of the third convolutional layer is set to 3×3×256×512, a stride is set to 1, and the dilation is set to 3.

11. The system for real-time target tracking based on deep learning according to claim 10, wherein the classification layer includes three fully-connected layers,
a kernel size of a first fully-connected layer is set to 3×3×512×512,
a kernel size of a second fully-connected layer is set to 1×1×512×512, and
a kernel size of a third fully-connected layer is set to 1×1×512×2.

12. The system for real-time target tracking based on deep learning according to claim 9, wherein the pre-training of the target tracking model is multi domain based learning in which training is performed on each domain for each image in which an independent target is present.

13. The system for real-time target tracking based on deep learning according to claim 12, wherein the training unit is configured to update parameters of each layer included in the target tracking model to minimize a loss function, and
the loss function represents a difference between a result value of detection of the tracking target from the image by the target tracking model and a true value.

14. The system for real-time target tracking based on deep learning according to claim 13, wherein the loss function includes an instance embedding loss for distinguishing different targets of similar shapes.

15. The system for real-time target tracking based on deep learning according to claim 14, wherein the instance embedding loss $L_{inst}$ is represented as the following Equation, $$L_{inst} = -\frac{1}{N}\sum_{i=1}^{N}\sum_{d=1}^{D}[y_i]_{1d} \cdot \log([\sigma_{inst}(f_i^d)]_{1d})$$

where N denotes the number of data included in a training batch, D denotes the number of domains, $y_i$ denotes a label of ith image with size of 2×D, $\sigma_{inst}$ denotes a softmax function in D channels in the domain direction, $f_i^d$ denotes an output forwarded a sample selected from dth domain to a network, $[\sigma_{inst}(f_i^d)]_{1d}$ denotes a positive score in dth domain in the present sample, and the target tracking model is trained, taking both the instance embedding loss and a binary class loss into account.

* * * * *